United States Patent [19]

Behr

[11] 4,067,203

[45] Jan. 10, 1978

[54] CONTROL SYSTEM FOR MAXIMIZING THE EFFICIENCY OF AN EVAPORATOR COIL

[75] Inventor: Joseph L. Behr, Des Peres, Mo.

[73] Assignee: Emerson Electric Co., St. Louis, Mo.

[21] Appl. No.: 720,698

[22] Filed: Sept. 7, 1976

[51] Int. Cl.$^2$ .............................................. F25B 41/00
[52] U.S. Cl. ......................................... 62/208; 62/224
[58] Field of Search ................. 62/208, 222, 224, 223, 62/212; 236/78 B, 91 A, 91 G; 237/1 A

[56] References Cited

U.S. PATENT DOCUMENTS

| 3,537,272 | 11/1970 | Hales et al. | 62/212 |
| 3,557,743 | 5/1971 | Long | 62/212 |
| 3,814,957 | 6/1974 | Way | 307/235 T |
| 3,967,781 | 7/1976 | Kunz | 236/68 R |

FOREIGN PATENT DOCUMENTS 2,334,508  1/1974  Germany ............................... 62/212

Primary Examiner—William E. Wayner
Assistant Examiner—R. J. Charvat
Attorney, Agent, or Firm—Polster, Polster and Lucchesi

[57] ABSTRACT

A method and apparatus for controlling the operation of a refrigeration system, for example, is provided. Refrigeration systems commonly include a compressor, an evaporator coil, a condensing coil and an expansion valve inserted in the refrigeration line between the evaporator coil and the condensing coil. In the preferred form of the invention, an electrically controlled expansion valve is operatively connected to control means. The control means includes a pair of sensors. The control means is used to control expansion valve operation so that evaporator operation is maximized, regardless of load on the system. Control is accomplished, in one embodiment, by sensing the temperature along two points of the evaporating coil, and using the control means to maintain a predetermined temperature relationship between the two points. In other embodiments of the invention, the control means is utilized to regulate system operation by sensing a compressor sump temperature, ambient air, or any other parameter bearing an overall system performance.

4 Claims, 6 Drawing Figures

CONTROL SYSTEM FOR MAXIMIZING THE EFFICIENCY OF AN EVAPORATOR COIL

BACKGROUND OF THE INVENTION

This invention relates to refrigeration systems, and in particular to a method and apparatus for ensuring maximum utilization of a refrigeration system. While the invention is described in detail with respect to a conventional refrigeration or air conditioning system, those skilled in the art will recognize the wider applicability of the invention disclosed hereinafter. The invention may find application, for example, with heat pumps, air conditioning, refrigeration systems, or other devices where system efficiency may be improved by monitoring specific parameters affecting that efficiency.

The operational features of a conventional air conditioning system are well known in the art. In general, such systems include a compressor which forces the particular refrigerant used in the system through a condensing coil, an expansion valve, an evaporation coil, and back to the suction side of the compressor. The expansion valve plays an important part in the overall efficiency exhibited by the system. Under ideal operating conditions, the expansion valve should admit an amount of refrigerant that can be evaporated and slightly super-heated in the evaporator coil. That is to say, the evaporator coil should be "wetted" along approximately its entire length to provide a good heat transfer rate and maximum system efficiency. In the past, some portion of the evaporator coil always has been dry. A dry evaporator coil portion was utilized in order to prevent the passage of liquid to the suction side of the compressor. Liquid entering the suction side of the compressor causes damage to the compressor valves. Consequently, it is the prevalent practice to design a system with a safety margin so that at light load conditions, the coil is operating at its most efficient point, in that maximum coil length is available for heat transfer. However, as the load increases, the length of coil available for effective heat transfer decreases so that heavy load conditions represent the least efficient operating area.

Thermostatic control valves presently are the most prevalent means for controlling the operation of a refrigeration system. Thermostatic control valves generally include a diaphragm actuated valve member having one side of the diaphragm operatively connected to a pressure generating means. The pressure generating means commonly is a sealed bulb or sensor having a gas responsive to temperature enclosed in it. The opposite side of the diaphragm is opposed by system pressure and the diaphragm is preloaded by means of a spring to set the operating point of the valve. Volume changes in the gas of the sensor, in response to changes in temperature, operate the valve. While these devices work well for their intended purposes, the thermostatic expansion valve cannot adequately improve system efficiency by assuring full utilization of the refrigeration coil, because a comparatively small system gain must be used to regulate system stability.

Thermostatic control valves suffer an additional disadvantage in heat pump applications. As will be appreciated, a heat pump, for explanational purposes, may be considered a reverse cycle refrigeration system. Consequently, two thermostatic expansion valves must be used, since a different adjustment of the valve normally is required for each coil. Thermostatic expansion valves also generally control flow only in one direction through the valve. Such duplication in heat pump applications results in increased cost.

As indicated above, under ideal operating conditions, the expansion valve should emit just the amount of refrigerant that can be evaporated and slightly super heated. That is to say, the evaporator shoud be wetted to the maximum extent so that optimum heat transfer results. Generally, it is known that the temperature along an evaporator coil, for example, decreases from the inlet to outlet more or less proportionally with the distance of a point along the coil from the inlet. At the point on the coil where super heating begins, the temperature reverses and begins to rise rapidly to the outlet of the coil. In a flooded coil, the temperature continues to drop throughout the coil while in a starved coil, the notch or temperature inversion moves toward the start of the coil.

The invention disclosed hereinafter permits the precise control of the expansion valve so that the coil can be operated safely in its flooded state, without the fear of damage to the compressor structure. In the alternative, the area of super heat can be controlled to such an extent that essentially the entire coil is available for heat transfer. This degree of control is achieved by measuring the temperature between two points on the coil, the two points being selected arbitrarily to give optimum efficiency, and by controlling fluid flow through the expansion valve to make the temperature at the first point equal to the temperature at the second point. As an optional feature, it is possible to bias the temperature sensed at the two points through the control circuit so that the temperature differential between the points becomes a function of a set of independent variables.

The control feature is stated mathematically as $F(X) = \Delta(T_1 - T_2)$. When the coil is starved, $T_2$ is larger than $T_1$, and the difference $T_1 - T_2$ is a negative signal which is used to drive the expansion valve to a more open condition, until the temperature differential between $T_1$ and $T_2$ is again 0. When the coil is flooded, $T_1$ is greater than $T_2$, so that the temperature differential $T_1 - T_2$ produces a positive signal, which again may be used to drive the expansion valve toward its closed position, to reduce the fluid flow until the temperature differential again approximates to 0. If the temperature differential $T_1 - T_2$ is maintained at 0, super heat in the coil always will be ideal and independent of any load on the evaporator coil.

One of the objects of this invention is to provide an improved means for controlling a refrigeration cycle of an apparatus.

Another object of this invention is to provide a method of operating a refrigeration system in which the evaporator coil is capable of operation at a completely saturated or wetted condition.

Another object of this invention is to provide a refrigeration system which employs electrical modulation of the evaporator and condensing coil.

Other objects of this invention will be apparent to those skilled in the art in light of the following description and accompanying drawings.

SUMMARY OF THE INVENTION

In accordance with this invention, generally stated, a system capable of refrigeration is provided with an expansion device and means for controlling the expansion device. The control means includes a pair of sensors which are placed at suitable locations, for example, at the entrance and at some point between and including the exit of the evaporator coil and the suction line entrance to the compressor used in conjunction with the system. The control means operates the expansion valve so that temperature differential between the sensors is approximately zero. Consequently, the evaporator coil is fully wetted and the point of superheat in the system is constant. A method of operating a system in which a fluid changes state includes operating an evaporator coil in a wetted state at all load conditions for the coil, and sensing at least one set of system parameters to ensure the condition of the coil and the safety of other components of the system.

DESCRIPTION OF THE PREFERRED EMBODIMENT

Figure 1:
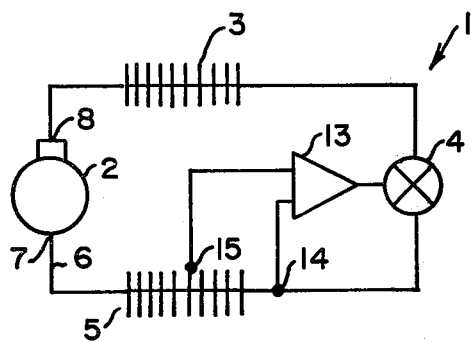
FIG. 1 is a schematic view, shown diagrammatically, for a refrigeration system employing this invention.

Referring now to FIG. 1, reference numeral 1 indicates a refrigeration system where my invention finds application. The system 1 may be a conventional air conditioning system, heat pump or refrigeration unit, for example. In general, the system 1 includes a compressor 2, a condensing coil 3, an expansion valve 4, and an evaporator coil 5, all of which are serially interconnected with one another by a refrigerant line 6.

The compressor 2 generally has a suction side 7 connected to the evaporator coil 5, and its pressure side 8 connected to the condensing coil 3. Refrigerant vapors drawn from the evaporator by the compressor are forced into the condensor, where the vapor liquifies. The liquid refrigerant then is returned to the evaporator through an expansion valve. The expansion valve converts the refrigerant from a high pressure liquid to a low pressure gas, by passing the refrigerant through a restriction in the valve. Control of refrigerant input to the evaporator can be maintained by inserting a valve member in the restriction of the expansion valve and adjusting the valve member in response to particular sensed conditions. Passage of the refrigerant through the expansion valve 4 can be varied so that some liquid enters the coil 5. That is to say, a wetted fluid may be passed through the coil 5, which converts to its gaseous form upon the absorption of heat. Coil 5 performance giving the highest heat transfer efficiency occurs when the evaporator coil 5 is wetted or "flooded" for its entire length. However, all the fluid in coil 5 must be in a gaseous state when the fluid reaches the compressor 2, in order to prevent damage to the valves of the compressor 2.

As previously indicated, thermostatic expansion valves are the prevalent means used for the expansion valve 4. In the thermostatic expansion valve, a temperature sensing means normally is positioned to sense the temperature on the outlet side of the coil 5. Commonly, the sensor is a closed, pressure generating system, having an enclosed gas which expands on increased temperature to force the expansion valve toward a more open position, system pressure acting to close the valve. Such devices are known to be relatively inefficient in operation. To overcome the thermostatic valve's inefficiency, electrically operated valves have been devised. A valve particularly well adapted for use with the invention disclosed herein is described in the U.S. Pat. No. 3,967,781 to Kunz. The electrically operated valve disclosed in Kunz includes a heater means 11 operatively associated with a valve 12 so that the application of electrical energy to the heater means 11 causes the valve member 12 to change positions. The expansion valve 4 is diagrammatically illustrated in FIGS. 2, 4 and 6. Elements of the valve 4 disclosed in Kunz and not repeated here are intended to be incorporated by reference.

To improve the efficiency of the evaporator coil 5, I provide a control means 13 for sensing conditions at the evaporator 5, and for regulating the valve 4. The ideal control of the system 1 discussed above can be achieved with my invention by sensing the temperature at a point 14 and 15 at the coil 5, and developing a control signal in the control means 13 to regulate the fluid flow through the expansion valve so that the temperature at point 14 equals the temperature at point 15. The points 14 and 15 are arbitrarily shown in FIG. 1, but generally are selected to give optimum efficiency for the system 1. The selection of the points 14 and 15, in fact, is a function of the system 1 designer's needs, and offers a great deal of flexibility.

By utilizing the control means 13 to maintain temperature equality between the point 14 and the point 15, rather explicit control of the evaporator coil 5 is maintained. Thus, when the coil 5 is starved, the temperature at point 14 is lower than the temperature at point 15, and the difference $T_{14}-T_{15}$ is a minus signal which is used to drive the expansion valve to a more open condition, admitting more fluid into the coil 5 until $T_{14}-T_{15}$ is again zero. When the coil 5 is flooded, $T_{14}$ is greater than $T_{15}$, so that the difference $T_{14}-T_{15}$ produces a plus signal which is used to drive the expansion valve towards its closed position to reduce fluid flow until $T_{14}-T_{15}$ again is zero. It is evident that if $T_{14}-T_{15}$ is maintained at zero, then the coil will be operating at its most efficient condition, that condition being independent of any system load on the evaporator coil.

Figure 2:
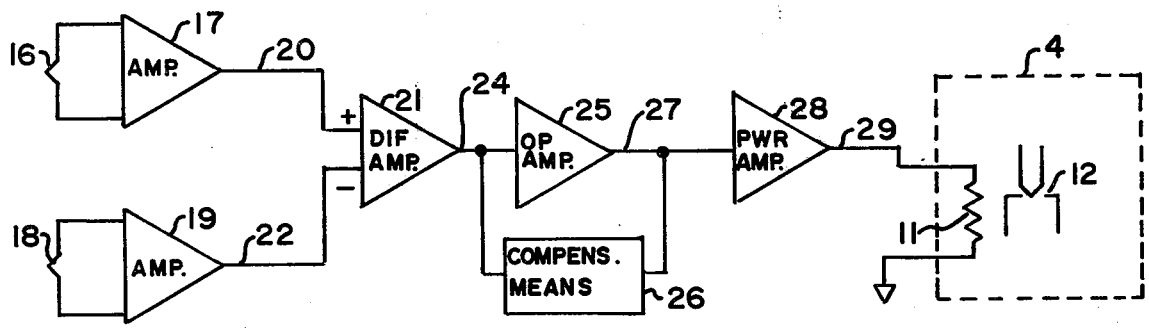
FIG. 2 is a block diagrammatic view of one illustrative embodiment of control means for the refrigeration system of FIG. 1.

The system shown diagrammatically in FIG. 1 is implemented in FIG. 2. As there illustrated, a sensor 16 is connected to a buffer amplifier 17, while a sensor 18 is operatively connected to a buffer amplifier 19. The sensors 17 and 18 may be silicon diodes which produce a voltage proportional to the sensed temperature. Other temperature sensors are compatable with the broader aspects of this invention. An output 20 of the buffer amplifier 17 forms a first input to a differential amplifier 21, while an output 22 of the buffer amplifier 19 forms a second input to the differential amplifier 21. The differential amplifier 22 has an output 24 forming an input to an operational amplifier 25. Amplifier 25 has an output side 27. Compensation means 26 is operatively connected between the side 27 and the side 24 of the amplifier 25. Output 27 of the amplifier 25 forms an input to a power amplifier 28. Power amplifier 28 has an output 29 which is connected to the heater means 11 of the expansion valve 4.

The compensation means 26 may comprise any of a variety of electrical devices to compensate for control means 13 system dynamics. That is to say, during operation of the control means 13, the components of the system may exhibit certain characteristics that will require compensation in order to provide proper control of the expansion valve 4.

The mathematical representation of the control feature embodied in FIG. 2 may be stated by the equation $f(x) = T_{14} - T_{15}$. $f(x)$ may be an arbitrary function of some selected independent variable. For example, $f(x)$ may be a function of compressor sump temperature, temperature of the inlet of the evaporator coil, ambient air temperature, or any other parameter bearing on overall system performance.

Figure 3:
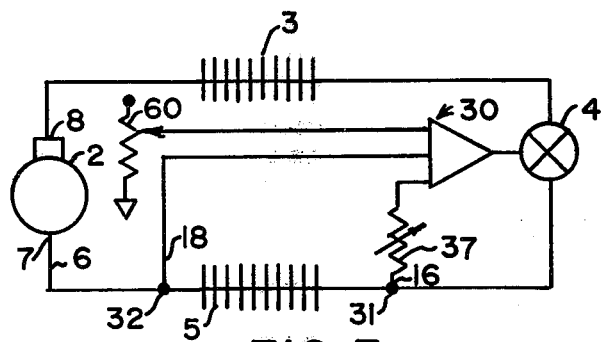
FIG. 3 is a schematic view, shown diagrammatically, for a refrigeration system employing a second illustrative embodiment of control means of this invention.

Those skilled in the art will recognize that the use of the control means 13 to modulate the evaporator coil 5 through the expansion valve 4 allows the total length of evaporator coil 5 to be used for heat transfer. That is to say, the entire length of the coil 5 may be flooded, or wetted, in distinction to the situation depicted in FIG. 1, where a certain, relatively short length of the coil 5 operates in a super-heated region. This operational condition is illustrated diagrammatically in FIG. 3, and is implemented in FIG. 4. Like reference numerals are used for equivalent components in all of the drawing figures, where appropriate. As shown in FIG. 3, a control means 30 has one of the sensors 16 and 18 operatively connected at the coil 5 inlet at a point 31, and the other of the sensors 16 and 18 operatively connected to the outlet of the coil 5 at a point 32. The snesors form first and second inputs to the control means 30. The sensor connected to the point 31 is electrically connected to the control means 30 through a variable gain means 37. In this embodiment, the coil 5 operates in a flooded condition. Normally, $T_{31} - T_{31}$ varies with load changes. However, because full utilization of the coil 5 is desired, $T_{31} - T_{32}$ should be a constant consistent with the coil design. Full utilization of the coil can be ensured by modifying the above-referenced equation by some function of $T_{31}$, the coil inlet temperature. Thus, the function controlled, $\Delta T$ will equal $T_{31} - T_{32} + KT_{31}$, where $T_{31} - T_{32}$ is a preselected differential and K is a preselected constant. In more general terms, $f(t) = K_1 T_{31} - K_2 T_{32} + KT_{31}$. That is, each function of the equation may be multiplied by some constant term. In FIG. 3, $K_1$ is supplied by the variable gain means 37, and $K_2$ is assumed to be equal to 1.

Figure 4:
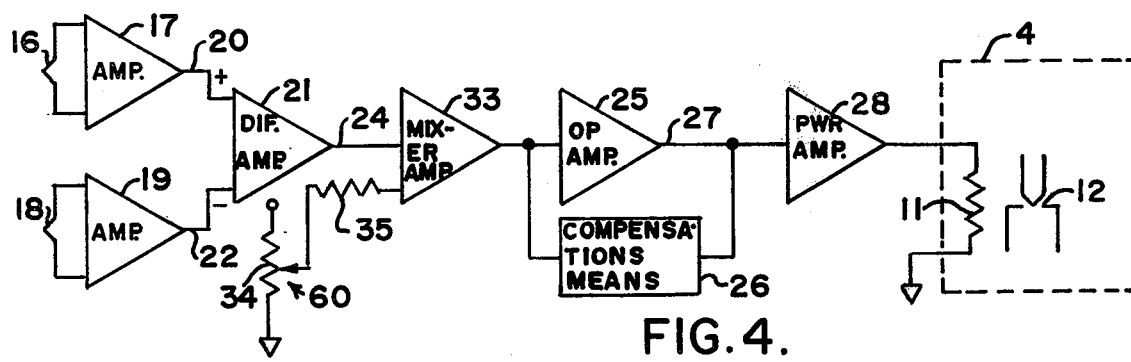
FIG. 4 is a block diagrammatic view of the control means shown in FIG. 3.

Implementation of the control means 30 is shown in FIG. 4. In general, the control means 30 is similar to the control means 13. The sensors 16 and 18 provide signals proportional to $T_{31}$ and $T_{32}$. Amplifiers 17 and 19 are selected to provide outputs at 20 and 22 at higher signal levels than the input to those amplifiers, the outputs being scaled so as to provide the proper input to the amplifier 21. The ratio of $K_1$ and $K_2$ is selected to provide the function $KT_{31}$. For example, if a value of K of 0.5 is desired, then $K_1/K_2 = 1.5$ and $1.5\ T_{31} - 1\ T_{32} = T_{31} - T_{32} + 0.5\ T_{31}$. The amplifier 17 preferably is a variable gain amplifier which supplies the function of the variable gain means 37 of FIG. 3. The differential amplifier 21 receives the inputs 20 and 22, and provides an output 24 forming a first input to a mixer amplifier 33.

In FIG. 4, a second input to the mixer amplifier 33 is obtained from a constant generator 60. The constant generator 60 is conventional and may comprise any suitable means for applying a desired input signal to the amplifier 33. Thus, constant generator 60 may include a potentiometer 34 and a scaling resistor 35. With the use of constant generator 60, the above recited equation becomes $f(T) = K_1 T_{31} - K_2 T_{32} \pm C$, where $C$ is a constant derived from constant generator 60. This is a slightly expanded equation from $f(T) = T_{31} - T_{32} + KT_{31}$ in that a constant offset is provided.

The output of the amplifier 33 is an input to the system dynamic compensation amplifier 25. The system dynamic compensation amplifier 25 provides lead and lag stabilization to compensate for control system 30 component dynamics, thereby enabling the system to operate stably at high loop gain. The output of the amplifier 25 again is amplified in the amplifier 28 and applied to the expansion valve 4 as described above.

Figure 5:
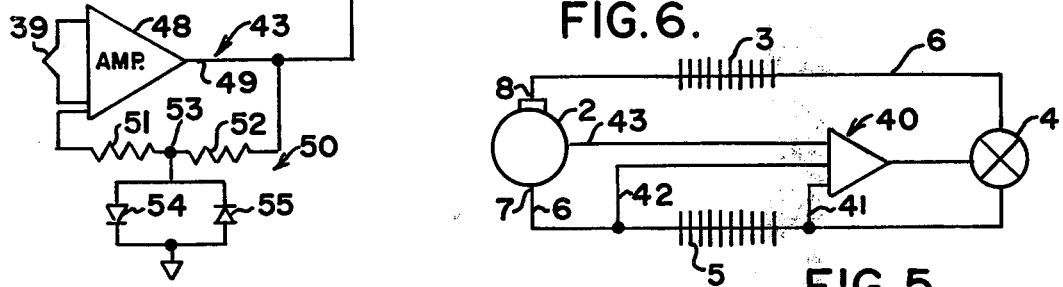
FIG. 5 is a schematic view, shown diagrammatically, of a refrigeration system employing a third illustrative embodiment of control means of this invention.

Use of the control means of this invention permits the use of a wider range of control parameters for regulating system 1 operation than possible with prior art devices. FIG. 5 is a further exemplification for yet another parameter, the monitoring of which is used to modulate coil 5 operation. Again, like reference numerals are used, where appropriate. In FIG. 5, a control means 40 is operatively connected between the compressor 2 and the expansion valve 4 to control operation of the expansion valve. The control means 40 includes a pair of sensors 41 and 42, and an override means 43. The sensors 41 and 42 may be similar to the sensors 17 and 18 described above. In this configuration, the coil 5 may be operated in a completely flooded state, the control of the system 1 being dependent upon the temperature sensed in the compressor 2.

Figure 6:
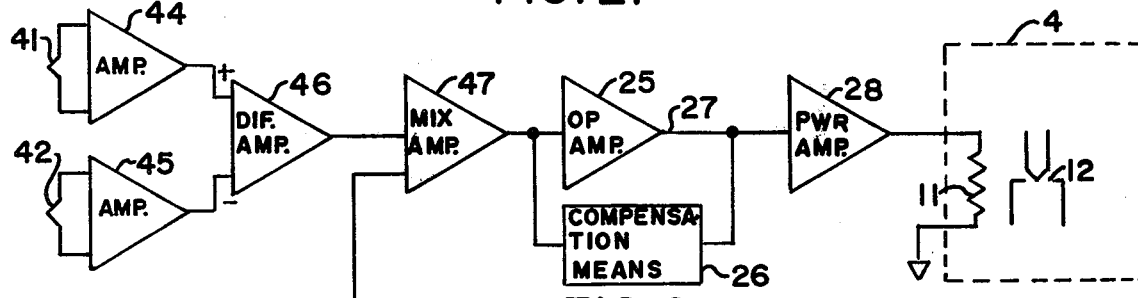
FIG. 6 is a block diagrammatic view of the control means shown in FIG. 5.

The control means 40 is set out in greater detail in FIG. 6, where it is observed that the sensor 41 is operatively connected to a buffer amplifier 44, while the sensor 42 is connected to a buffer amplifier 45. The outputs of the amplifiers 44 and 45 form an input to a differential amplifier 46. The output of amplifier 46 forms a first input to a mixer amplifier 47. A second input to the mixer amplifier is received from an override means 43. The output of mixer amplifier 47 forms an input to the amplifier 25, the remaining components of the control circuit 40 being similar to that described in conjunction with the embodiments of FIGS. 2 and 4.

Override means 43 includes a sensor 39. Temperature sensor 39 is preferably a silicon diode similar to those described above. Sensor 39 is connected across two inputs of an amplifier 48. An output 49 of amplifier 48 defines the output of override means 43, and forms a second input to the amplifier 47. A feedback loop 50 is connected between the output 49 and the input of the amplifier 47. Feedback loop 50 includes a pair of resistors 51 and 52. A connection point 53 intermediate the resistors 51 and 52 is connected to ground through a pair of diodes 54 and 55, respectively. Diode 54 has its anode side connected to the point 53 and its cathode side connected to ground, while diode 55 has its cathode side connected to the point 53 and its anode side connected to ground.

Operation of the control means 40 is similar to that described in conjunction with the other embodiments of this invention in that the sensors 41 and 42 provide electrical signals proportional to the temperature sensed at two locations within the refrigeration system 1. The control means 40 hereafter functions to maintain the temperature sensed by the sensors 41 and 42 equal to one another. Again, those skilled in the art will recognize that the equation $f(t) = T_{41} - T_{42}$ may be expanded to include preselected constants and constant effect terms similar to those described in conjunction with the embodiment of FIGS. 3 and 4, or in a function of $f(T) = K_1T_{41} - K_2T_{42} + K_1T_{41} + C$, where $K_1$, $K_2$ and $C$ are constants chosen to optimize system operation. The amplifier 48 functions as a safety device in that it operates only when the temperature sensed, for example, in the compressor sump, falls outside predetermined limits. Thus, safe operating temperature for the compressor 2 generally is considered to be between 70° and 140° F. In this range, feedback along the loop 50 effectively cancels the output of the amplifier 48. As the temperature sensed by the sensor 43 passes through the predetermined limits of temperature range, output at 49 increases substantially, so that one of the diodes 54 and 55 becomes back biased, shunting the feedback signal to ground. Input to the amplifier 47 from the amplifier 48 is increased greatly and overrides the input from the amplifier 46 until the system 1 is again stabilized.

It is thus apparent that a system meeting all the ends and objects herein set forth above have been disclosed.

Numerous variations, within the scope of the appended claims, will be apparent to those skilled in the art in light of the foregoing description and accompanying drawings. Thus, various components indicated as preferred may be changed in other embodiments of this invention. The basic principle of the invention involves the direct control of an evaporator coil by direct measurement of a variable parameter and using a signal based on that measurement to maintain maximum heat transfer capability in the coil. The location of the various sensors may be varied from the location described. In like manner, while the valve described in the Kunz U.S. Pat. No. 3,967,781, is well suited for use in conjunction with this invention, other valve types are compatible with the broader aspects of the invention. These variations are merely illustrative.

Having thus described the invention, what is claimed and desired to be secured by Letters Patent is:

1. A system and control means therefor, comprising:
    a compressor, said compressor including a fluid sump;
    a first coil operatively connected to said compressor;
    a second coil operatively connected to said first coil and to said compressor;
    an electrically operable expansion valve connected between said first and said second coils, said expansion valve including electrically energizable means for controlling the position of said valve; and
    control means operatively connected between said system and the electrically energizable means of said expansion valve, said control means including a first sensor for sensing a condition in said system, a second sensor for sensing the same condition in said system at a point displaced from said first sensor, differential means for comparing the condition sensed by said first and said second sensors, said differential comparing means having an input side operatively connected to said first and said second sensors, and an output side, a mixer amplifier having a first input operatively connected to the output of said differential comparing means, and a second input, and override means having an output side forming a second input to said mixer amplifier, said override means including a third sensor for sensing a condition in said system, amplifier means operatively connected to said third sensor, and feedback means connected between the output and the input sides of said amplifier, said feedback means acting to remove the output of said amplifier under certain predetermined conditions sensed by said third sensor, the output side of said mixer amplifier being operatively connected to said electrically energizable means, said control means acting to regulate fluid flow through said expansion valve so as to establish equality in the condition sensed by said first and said second sensors.

2. The system of claim 1 including a power amplifier having an input side operatively connected to said mixer amplifier, and an output side operatively connected to said expansion valve, and control system compensation means operatively connected between the output side of said power amplifier and the input side of said power amplifier.

3. A system and control means therefor, comprising:
    a compressor;
    a first coil operatively connected to said compressor;
    a second coil operatively connected to said first coil and to said compressor;
    an electrically operable expansion valve connected between said first and said second coils, said expansion valve including electrically energizable means for controlling the position of said valve; and
    control means operatively connected between said system and the electrically energizable means of said expansion valve, said control means including a first sensor for sensing a condition in said system, a second sensor for sensing the same condition in said system at a point displaced from said first sensor, means for comparing the condition sensed by said first and said second sensors, said comparing means having an input side operatively connected to said first and said second sensors, and an output side, a mixer amplifier having a first input operatively connected to the output of said comparing means, and a second input, a third sensor for sensing a condition in said system, said third sensor being operatively connected to the second input of said mixer amplifier, and means for regulating the application of the output of said third sensor to the input of said mixer amplifier so that the output of said third sensor is applied upon the occurance of some predetermined condition, said mixer amplifier having an output side operatively connected to said electrically energizable means, said control means acting to regulate fluid flow through said expansion valve so as to establish equality in the condition sensed by said first and said second sensors.

4. The system of claim 3 including a power amplifier having an input side operatively connected to said mixer amplifier, and an output side operatively connected to said expansion valve, and control system compensation means operatively connected between the output side of said power amplifier and the input side of said power amplifier.

* * * * *

UNITED STATES PATENT AND TRADEMARK OFFICE
CERTIFICATE OF CORRECTION

PATENT NO. : 4,067,203
DATED : January 10, 1978
INVENTOR(S) : Joseph L. Behr

It is certified that error appears in the above-identified patent and that said Letters Patent are hereby corrected as shown below:

Col. 5, line 33, "snesors" should be "sensors"; and line 38, "$T_{31} - T_{31}$" should be "$T_{31} - T_{32}$".

Signed and Sealed this

*Twenty-seventh* Day of *June 1978*

[SEAL]

*Attest:*

RUTH C. MASON
*Attesting Officer*

DONALD W. BANNER
*Commissioner of Patents and Trademarks*